(12) United States Patent
Buyukkoc et al.

(10) Patent No.: US 8,990,317 B2
(45) Date of Patent: Mar. 24, 2015

(54) SHARED MULTIMEDIA EXPERIENCE

(75) Inventors: Cagatay Buyukkoc, Holmdel, NJ (US); Robert C. Streijl, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 250 days.

(21) Appl. No.: 12/953,590

(22) Filed: Nov. 24, 2010

(65) Prior Publication Data
US 2012/0131110 A1    May 24, 2012

(51) Int. Cl.
| | |
|---|---|
| *G06F 15/16* | (2006.01) |
| *H04L 29/08* | (2006.01) |
| *H04N 21/242* | (2011.01) |
| *H04N 21/258* | (2011.01) |
| *H04N 21/422* | (2011.01) |
| *H04N 21/4223* | (2011.01) |

(Continued)

(52) U.S. Cl.
CPC .............. *H04L 67/24* (2013.01); *H04N 21/242* (2013.01); *H04N 21/258* (2013.01); *H04N 21/25808* (2013.01); *H04N 21/42203* (2013.01); *H04N 21/4223* (2013.01); *H04N 21/4307* (2013.01); *H04N 21/44218* (2013.01); *H04N 21/4438* (2013.01); *H04N 21/4788* (2013.01); *H04L 65/4038* (2013.01); *H04L 69/24* (2013.01)
USPC ............. 709/206; 709/231; 709/232; 725/56; 725/78; 725/110

(58) Field of Classification Search
CPC .................... G06Q 30/0267; H04N 21/41407; H04N 21/440236; H04N 21/47217; H04N 21/4788; H04N 21/4223; H04N 21/00; H04N 21/4316; H04N 21/6125; H04N 19/0023; H04N 19/00266; H04N 21/6405; H04N 7/0806; H04N 21/4622; H04N 21/47202; H04N 21/4126; H04N 21/43637; H04N 21/6175; H04N 21/23424; H04N 5/23206; H04N 5/775; H04N 13/0447; H04N 21/4307
See application file for complete search history.

(56) References Cited

U.S. PATENT DOCUMENTS 6,871,236 B2 *   3/2005   Fishman et al. .............. 709/246
7,143,428 B1    11/2006   Bruck et al.

(Continued)

OTHER PUBLICATIONS

"BT and Microsoft Announce Partnership to Deliver Powerful, First-of-its-Kind Entertainment Experience to Consumers Through Xbox 360", from http://www.microsoft.com/presspass/press/2008/jan08/01-06MSBTXbocPR.mspx, Oct. 27, 2010, pp. 1-2.

*Primary Examiner* — Dustin Nguyen
*Assistant Examiner* — Hao Nguyen
(74) *Attorney, Agent, or Firm* — Toler Law Group, PC

(57) ABSTRACT

A method includes receiving a request to establish a group presence session between at least a first device associated with a first network and a second device associated with a second network. During the group presence session, multimedia content is provided to the first device and to the second device at substantially the same time, and first presence information from the first device is provided to the second device at substantially the same time as second presence information from the second device is provided to the first device. The method further includes synchronizing the multimedia content, the first presence information, and the second presence information based on a first device capability, a second device capability, information associated with the first network, and information associated with the second network. Synchronized content streams that include the multimedia content and presence information are transmitted to the devices via the respective networks.

20 Claims, 5 Drawing Sheets

(51) Int. Cl.
*H04N 21/43* (2011.01)
*H04N 21/442* (2011.01)
*H04N 21/443* (2011.01)
*H04N 21/4788* (2011.01)
*H04L 29/06* (2006.01)

(56) References Cited

U.S. PATENT DOCUMENTS

| | | | |
|---|---|---|---|
| 2002/0103919 A1* | 8/2002 | Hannaway | 709/231 |
| 2003/0013526 A1 | 1/2003 | Galyean et al. | |
| 2004/0043770 A1* | 3/2004 | Amit et al. | 455/450 |
| 2005/0091694 A1 | 4/2005 | Rambo | |
| 2006/0203760 A1* | 9/2006 | Fukui et al. | 370/328 |
| 2006/0271960 A1 | 11/2006 | Jacoby et al. | |
| 2007/0088817 A1 | 4/2007 | Li | |
| 2007/0198738 A1* | 8/2007 | Angiolillo et al. | 709/231 |
| 2008/0109878 A1* | 5/2008 | Delegue et al. | 726/3 |
| 2008/0244019 A1* | 10/2008 | Mellor et al. | 709/206 |
| 2008/0268947 A1* | 10/2008 | Fyock et al. | 463/29 |
| 2009/0169171 A1* | 7/2009 | Massey et al. | 386/68 |
| 2009/0210552 A1* | 8/2009 | Ozugur et al. | 709/232 |
| 2009/0233542 A1* | 9/2009 | Gratton et al. | 455/3.06 |
| 2010/0005517 A1* | 1/2010 | Foti | 726/6 |
| 2010/0037266 A1* | 2/2010 | Rahman | 725/56 |
| 2010/0095337 A1* | 4/2010 | Dua | 725/110 |
| 2010/0153576 A1* | 6/2010 | Wohlert et al. | 709/231 |
| 2010/0235438 A1* | 9/2010 | Narayanan et al. | 709/203 |
| 2011/0197237 A1* | 8/2011 | Turner | 725/78 |
| 2013/0258967 A1* | 10/2013 | Watfa et al. | 370/329 |

\* cited by examiner

SHARED MULTIMEDIA EXPERIENCE

FIELD OF THE DISCLOSURE

The present disclosure is generally related to multi-party communications.

BACKGROUND

Social networking applications may provide users with an environment to share information. For example, social networking web sites may enable a user to exchange messages, photographs, and videos with one or more other users (e.g., friends or family members). As another example, telepresence, videoconferencing, and video telephony services may enable a user to communicate with one or more other users. An enhanced social networking experience may be attractive to some users.

DETAILED DESCRIPTION

Figure 1:
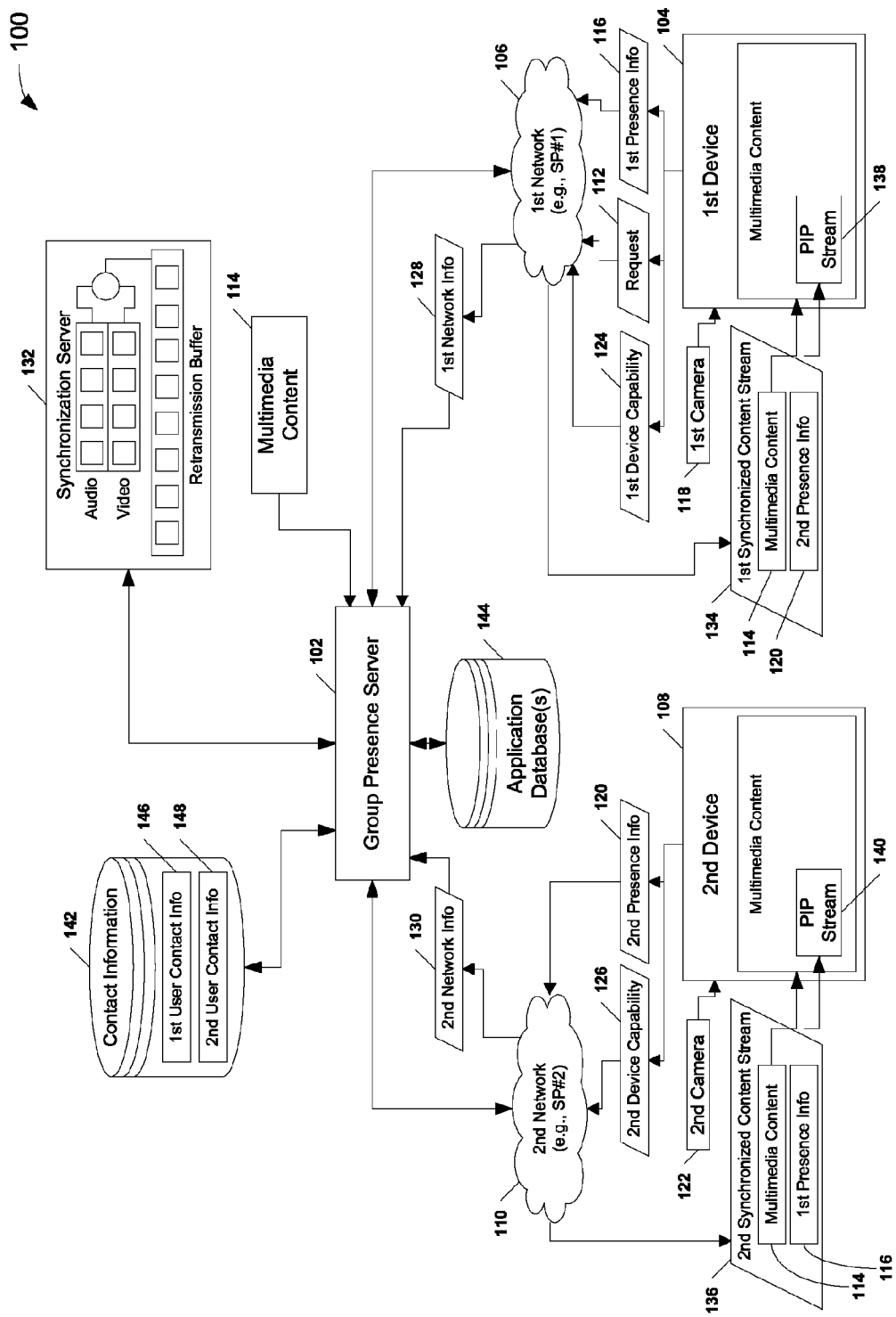
FIG. 1 is a block diagram of a first illustrative embodiment of a group presence system.

An environment that enables multiple users to "share" a multimedia experience (e.g., a group presence session) in the privacy of a selected group may provide users with an improved social networking experience. For example, users that are located in different locations (e.g., different geographical areas) may be able to share a service together at the same time and experience each other's presence while consuming the service. A group presence session that provides integrated video, voice (e.g., speaking between members in the group), and audio (e.g., listening to the service) may be attractive to such users. For example, services that can involve multiple people may include watching a television program (e.g., a sporting event), video on demand (VoD) content, or playing a video game, among other alternatives.

In a particular embodiment, a method includes receiving a request to establish a group presence session between at least a first device associated with a first network and a second device associated with a second network. The request is received at a group presence server from the first device. During the group presence session, multimedia content is to be provided to the first device at substantially the same time as the multimedia content is to be provided to the second device, and first presence information from the first device is to be provided to the second device at substantially the same time as second presence information from the second device is to be provided to the first device. The method includes determining a first device capability of the first device and a second device capability of the second device. The method further includes synchronizing the multimedia content, the first presence information, and the second presence information based on the first device capability, the second device capability, information associated with the first network, and information associated with the second network. A first synchronized content stream that includes the multimedia content and the second presence information is transmitted to the first device via the first network. A second synchronized content stream that includes the multimedia content and the first presence information is transmitted to the second device via the second network.

In another particular embodiment, a non-transitory computer readable storage medium includes instructions that are executable by a processor. The instructions, when executed by the processor, cause the processor to receive a request from a first device associated with a first network to establish a group presence session (e.g., a shared multimedia experience) between at least the first device and a second device. During the group presence session, multimedia content is to be provided to the first device at substantially the same time as the multimedia content is to be provided to the second device, and first presence information from the first device is to be provided to the second device at substantially the same time as second presence information from the second device is to be provided to the first device. The instructions, when executed by the processor, cause the processor to determine a first device capability of the first device and a second device capability of the second device. The instructions, when executed by the processor, cause the processor to synchronize the multimedia content, the first presence information, and the second presence information based on the first device capability, the second device capability, information associated with the first network, and information associated with the second network. A first synchronized content stream that includes the multimedia content and the second presence information is transmitted to the first device via the first network. A second synchronized content stream that includes the multimedia content and the first presence information is transmitted to the second device via the second network.

In another particular embodiment, a system includes a processor and a non-transitory computer readable storage medium that includes instructions that are executable by the processor. The instructions, when executed by the processor, cause the processor to receive a request from a set-top box (STB) device associated with an internet protocol television (IPTV) network to establish a group presence session between at least the STB device and a second device associated with a second network. During the group presence session, multimedia content is to be provided to the STB device at substantially the same time as the multimedia content is to be provided to the second device, and first presence information from the STB device is to be provided to the second device at substantially the same time as second presence information from the second device is to be provided to the STB device. The instructions, when executed by the processor, cause the processor to determine a first device capability of the STB device and a second device capability of the second device. The instructions, when executed by the processor, cause the processor to synchronize the multimedia content, the first presence information, and the second presence information based on the first device capability, the second device capability, information associated with the IPTV network, and information associated with the second network. A first synchronized content stream that includes the multimedia content and the second presence information is transmitted to the STB device via the IPTV network. A second synchronized content stream that includes the multimedia content and the first presence information is transmitted to the second device via the second network.

Referring to FIG. 1, a particular illustrative embodiment of a group presence system is shown and is designated 100. In the embodiment illustrated in FIG. 1, the system 100 includes a group presence server 102, a first device 104 associated with a first network 106, and a second device 108 associated with a second network 110. A group presence session may enable multiple users to experience a "shared" multimedia experience that includes synchronized content and synchronized presence information while the users are located at different locations and connected via different networks. In alternative embodiments, the multimedia experience may be "shared" by more than two devices (See e.g., FIG. 3).

The group presence server 102 is configured to receive a request 112 from the first device 104 associated with the first network 106 to establish a group presence session between at least the first device 104 and the second device 108 associated with the second network 110. In the embodiment illustrated in FIG. 1, the first network 106 may be associated with a first communications service provider, and the second network 110 may be associated with a second communications service provider (i.e., a different communications service provider). Alternatively, the first network 106 may be associated with a first network of a communications service provider (e.g., a wireline network), and the second network 110 may be associated with a second network of the same communications service provider (e.g., a wireless network).

The group presence server 102 is configured to provide multimedia content 114 to the first device 104 and to the second device 108 at substantially the same time during the group presence session. During the group presence session, first presence information 116 from the first device 104 (e.g., video of a first user captured via a first camera 118) may be provided to the second device 108 at substantially the same time as second presence information 120 from the second device 108 (e.g., video of a second user captured via a second camera 122) is provided to the first device 104. While not shown in FIG. 1, the first presence information 116 and the second presence information 120 may also include audio information, text information, graphical information, or a combination thereof. For example, a first microphone integrated within or otherwise connected to the first device 104 may capture audio information from the first user at the first device 104, and a second microphone integrated within or otherwise connected to the second device 108 may capture audio information from the second user at the second device 108.

The group presence server 102 may be configured to determine a first device capability 124 of the first device 104 and a second device capability 126 of the second device 108. Further, the group presence server 102 may be configured to determine first network information 128 associated with the first network 106 and second network information 130 associated with the second network 110. In one embodiment, the device capabilities 124, 126 and the network information 128, 130 may be provided to the group presence server 102 (e.g., provided by the devices 104, 108 or provided by the networks 106, 110). Alternatively, the group presence server 102 may be configured to determine the device capabilities 124, 126 and the network information 128, 130 without receiving information from the devices 104, 108 or the networks 106, 110.

In a particular embodiment, the device capabilities 124, 126 may include hardware capabilities, software capabilities, or a combination thereof. As an illustrative example, the first device 104 may be capable of rendering the multimedia content 114 at a first frame rate (e.g., 30 frames per second), while the second device 108 may be capable or rendering the multimedia content 114 at a second frame rate (e.g., 20 frames per second). In a particular embodiment, the network information 128, 130 may include information such as available bandwidth, latency, reliability (e.g., dropped packets), or any combination thereof. As an illustrative example, the first network 106 may be capable of delivering the multimedia content 114 to the first device 104 at a first data rate (e.g., 100 million bits per second (Mbps)), while the second network 110 may be capable of delivering the multimedia content 114 to the second device 108 at a second data rate (e.g., 10 Mbps).

In a particular embodiment, the group presence server 102 may be configured to synchronize the multimedia content 114 and the presence information 116, 120. Alternatively, a synchronization server 132 may be configured to perform the synchronization. Synchronization may be performed based on at least the device capabilities 124, 126 and the network information 128, 130. The term synchronization may include synchronization with respect to one or more service features or applications or with respect to timing.

To illustrate, a subscriber associated with the first device 104 may subscribe to a television channel associated with the multimedia content 114, while a second subscriber associated with the second device 108 may not subscribe to the television channel. In this case, the second subscriber may be charged to receive the multimedia content 114 associated with the television channel. As an example, the second subscriber may incur a charge associated with viewing the television channel during the group presence session (e.g., a charge associated with temporary access to the television channel). Alternatively, the second subscriber may be prompted to subscribe to the television channel in order to join the group presence session (e.g., a charge associated with full subscription). As another example, a subscriber associated with the first device 104 may have access to software associated with a multi-player game, while a second subscriber associated with the second device 108 may not have access to the software. In this case, synchronization may include providing the software to the second device 108 in order to establish a multi-player gaming group presence session.

As another example, the first camera 118 may be a "web cam" with an ability to capture the first presence information 116 at a first image capture capability (e.g., 2.0 megapixels at 30 frames per second), and the second camera 122 may have a second image capture capability (e.g., 1.3 megapixels at 20 frames per second). Further, the first network 106 may be a broadband network (e.g., an IPTV network), and the second network 110 may have a different bandwidth compared to the first network 106. In these illustrative examples, synchronization may include compensating for the different capabilities of the devices or networks. For example, compensation may include adjusting the presence information 116, 120 to be rendered at a common frame rate (e.g., at 20 frames per second) or at a common frame rate and resolution (e.g., 1.3 megapixels at 20 frames per second). As a further example, compensation may include communicating the multimedia content 114 and the presence information 116, 120 to account for different network data rates (e.g., 100 Mbps via the first network 106 versus 10 Mbps via the second network 110). In this case, the group presence server 102 may compensate for the different network data rates by delivering the multimedia content 114 and the presence information 116, 120 based on the slower data delivery capability (e.g., based on the 10 Mbps capability).

In one embodiment, the synchronization server 132 may synchronize the multimedia content 114 based on such information in order to provide the first user at the first device 104 with a multimedia experience that is similar to a multimedia experience provided to the second device 108 (e.g., a "shared" multimedia experience). In a particular illustrative embodiment, the synchronization server 132 may store at least a portion of the multimedia content 114 (e.g., audio and video information). As an example, the synchronization server 132 may utilize a retransmission buffer to prevent disruption of the group presence session.

In a particular illustrative embodiment, one of the users may execute a "trick play" feature (e.g., pausing, rewinding, or fast forwarding the multimedia content 114, among other alternatives). In this case, the synchronization server 132 may store content for subsequent delivery via the group presence server 102 (e.g., in the event that a user pauses or rewinds a broadcast television program) or may provide stored content to the group presence server 102 (e.g., in the event that a user fast forwards a recorded television program or VoD content). In one embodiment, in response to execution of the "trick play" feature, the group presence server 102 may prevent other users from executing other "trick play" features and may provide a temporary message (e.g., "the other user paused for a moment"). As an example, if the first user pauses a broadcast television program, the group presence server 102 may prevent other users from restarting the program (e.g., the first user that paused the program may retain control).

In another illustrative embodiment, the first device 104 may be located in a first geographical area that is able to receive a particular television channel (e.g., a local television channel), while the second device 108 may be located in a second geographical area that is not able to receive the particular television channel. In this case, synchronization may include making the particular television channel available to the second device 108 (e.g., via a VoD channel). As another example, the first device 104 may be located in a first time zone that receives the multimedia content 114 at a first time, while the second device 108 may be located in a second time zone that receives the multimedia content 114 at a different time. In this case, synchronization may include storing the multimedia content 114 (e.g., at the synchronization server 132) to enable synchronized viewing despite the different broadcast times. Alternatively, the synchronization server 132 may provide the multimedia content 114 in substantially real-time to the second device 108 despite the fact that the multimedia content 114 is scheduled to be broadcast to the second device 108 at a later time.

As an illustrative example, a sporting event may be broadcast live to the first device 104 that is located in a first geographical location. As an example, the sporting event may be a football match being played in South Africa (e.g., the World Cup). A group presence session may be convenient for the first user of the first device 104 during the live broadcast but may be inconvenient for the second user of the second device 108. For example, the football match may be broadcast live to the first device 104 at noon, while the time at a second geographical location associated with the second device 108 may be midnight. In this case, synchronization may include recording the football match for synchronized delivery of the multimedia content 114 during a group presence session at a time that is convenient for both users (e.g., at 8 p.m. for the first device 104 and 8 a.m. for the second device 108).

The group presence server 102 is configured to transmit a first synchronized content stream 134 to the first device 106 via the first network 106. The first synchronized content stream 134 may include the multimedia content 114 (e.g., a television program) and the second presence information 120 (e.g., video and audio of the second user). The group presence server 102 is further configured to transmit a second synchronized content stream 136 to the second device 108 via the second network 110. The second synchronized content stream 136 may include the multimedia content 114 (e.g., the same television program that is delivered to the first user at the first device 104) and the first presence information 116 (e.g., video and audio of the first user).

In operation, the first user of the first device 104 may send the request 112 to the group presence server 102 in order to establish a group presence session between the first device 104 and the second device 108. For example, the first network 106 may include an internet protocol television (IPTV) network of a first communications service provider, and the first user may be viewing the multimedia content 114. In one embodiment, the group presence server 102 is associated with a multimedia content service provider, and the multimedia content 114 (e.g., a television channel, video on demand (VoD) content, or other content) is provided by the multimedia content service provider. To illustrate, the first device 104 may be a set-top box (STB) device that may be communicatively coupled to a television or other display device. Alternatively, the first device 104 may be a residential gateway that is configured to communicate with one or more devices that are located at a customer premises of the first user. In this case, the residential gateway may communicate information to a television or other display device directly or via another device (e.g., via a STB device).

The group presence server 102 may receive the request 112 from the first device 104. In response, the group presence server 102 may communicate a notification of the request 112 to the second device 108 and receive confirmation that the second user wishes to join the group presence session prior to establishing the group presence session. In order to provide synchronized content in response to the request 112, the group presence server 102 may utilize at least the first device capability 124, the second device capability 126, and the network information 128, 130. In one embodiment, the group presence server 102 receives the first device capability 124 from the first device 104 and receives the second device capability 126 from the second device 108. Further, the group presence server 102 may receive the network information 128, 130 from the networks 106, 110. Alternatively, the group presence server 102 may determine the device capabilities 124, 126 and the network information 128, 130. For example, in the embodiment illustrated in FIG. 1, the group presence server 102 is communicatively coupled to a contact information database 142 and to an application database 144. As an example, a device capability application stored at the application database 144 may be used to determine the device capabilities 124, 126 based on information associated with the devices 104, 108 (e.g., device identifiers such as MAC addresses, serial numbers, or other device identifier information). As another example, a network identification application stored at the application database 144 may determine the network information 128, 130. Alternatively, the information stored at the contact information database 142 may be used to determine the device capabilities 124, 126 and/or the network information 128, 130 (e.g., based on first user contact information 146 and second user contact information 148).

Upon determining the device capabilities 124, 126 and the network information 128, 130, the group presence server 102 may utilize the synchronization server 132 to synchronize content to be delivered to the devices 104, 108. The synchronization may be performed based on the first device capability 124, the second device capability 126, the first network information 128, and the second network information 130.

The group presence server 102 may transmit the first synchronized content stream 134 to the first device 104 and may transmit the second synchronized content stream 136 to the second device 108. The first synchronized content stream 134 includes the multimedia content 114 and the second presence information 120. In the embodiment illustrated in FIG. 1, a picture-in-picture (PIP) stream 138 associated with the second presence information 120 may be superimposed on the multimedia content 114 when displayed to the first user via the first device 104. The second synchronized content stream 136 includes the multimedia content 114 and the first presence information 116. In the embodiment illustrated in FIG. 1, a PIP stream 140 associated with the first presence information 116 may be superimposed on the multimedia content 114 when displayed to the second user via the second device 108. In another embodiment, the second device 108 may not support the display of PIP streams. In this case, the first presence information 116 and the multimedia content 114 may be merged into a single content stream to be displayed to the second user via the second device 108.

As an illustrative example, the multimedia content 114 may include a football match. By synchronizing the multimedia content 114 to be displayed at both devices 104, 108 at substantially the same time, both users may experience a particular event during the football match (e.g., a goal) at substantially the same time. By synchronizing the presence information 116, 120 to be displayed at both devices 104, 108 at substantially the same time as the multimedia content 114, the users can experience each other's reactions to the goal as though each were watching the football match at the same location. The users may be able to adjust an amount of display area that is to be occupied by the PIP streams 116, 120 in order to ensure that the viewing experience is not disrupted.

Thus, the system 100 of FIG. 1 may enable the first user of the first device 104 to experience a "shared" multimedia experience with the second user of the second device 108 despite differences with respect to location, network, or device capabilities.

Figure 2:
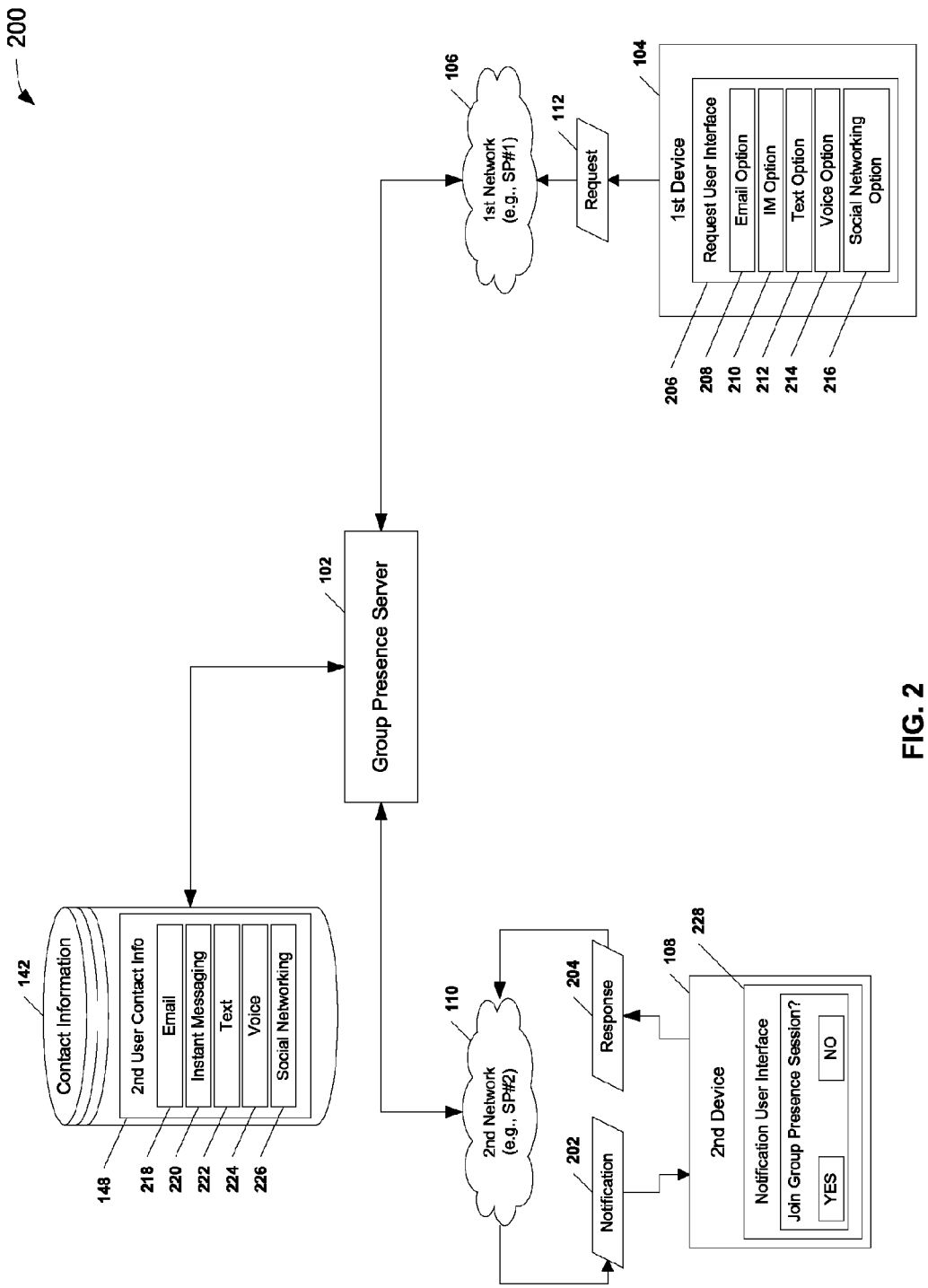
FIG. 2 is a block diagram of a second illustrative embodiment of a group presence system.

Referring to FIG. 2, a particular illustrative embodiment of a group presence system is shown and is designated 200. The system 200 includes the group presence server 102, the first device 104 associated with the first network 106, the second device 108 associated with the second network 110, and the contact information database 142 of FIG. 1. FIG. 2 illustrates that the first user of the first device 104 may invite the second user to establish the group presence session by communicating a notification 202 via one or more selected contact options. The group presence session may be established in response to the second user accepting the invitation by providing a response 204.

The group presence server 102 is configured to communicate the notification 202 of the request 112 to the second device 108. The notification 202 is communicated to the second device 108 based on input received from a user of the first device 104. The notification 202 may be communicated to the second device 108 via at least one of an email message, an instant messaging (IM) message, a text message, a voice message, and a social networking site message. The group presence server 102 may be configured to communicate a notification of the request 112 to another device that is associated with the second user (e.g., a device other than the second device 108 of FIG. 1). For example, the group presence server 102 may communicate a notification to a mobile device of the second user. In a particular embodiment, the second user may join the group presence session via the second device 108 after receiving the notification at the mobile device. Thus, the group presence server 102 may communicate notifications to one or more devices that are associated with the second user (e.g., to one or more devices that are different from the device that is used to join the group presence session). The second user may designate one or more devices that are to receive notifications associated with requests to establish a group presence session.

In a particular embodiment, a request user interface 206 that is displayed via the first device 104 is configured to receive a selection of a notification option from a plurality of selectable notification options. For example, the request user interface 206 of FIG. 1 includes an email notification option 208, an IM notification option 210, a text notification option 212, a voice notification option 214, and a social networking notification option 216. In a particular embodiment, the selected notification option may be included in the request 112 that is communicated to the group presence server 102.

In a particular embodiment, the particular notification options that are presented to the first user via the request user interface 206 are determined based on information stored at the contact information database 142. For example, in response to receiving the request 112 from the first user to establish the group presence session with the second user of the second device 108, the group presence server 102 may query the contact information database 142 to identify the second user contact information 148. To illustrate, the second user contact information 148 may include email contact information 218, IM contact information 220, text contact information 222, voice contact information 224, social networking contact information 226, other contact information, or any combination thereof. The second user contact information 148 may be communicated to the first device 104 to be displayed at the request user interface 206. Alternatively, the second user contact information 148 may be locally accessible to the first device 104.

In a particular embodiment, a notification user interface 228 may be presented at the second device 108 to receive the response 204 from the second user, accepting or declining the invitation to join the group presence session. Alternatively, the second device 108 may be configured to automatically accept or decline group presence sessions from one or more users.

Thus, FIG. 2 illustrates that a user may invite another user to establish a group presence session by communicating the notification 202 via one or more selected contact options. The group presence session may be established in response to the invited user accepting the invitation by providing the response 204. The plurality of contact notification options presented via the request user interface 206 may enable the initiator of the group presence session to invite other participants in a variety of ways.

Figure 3:
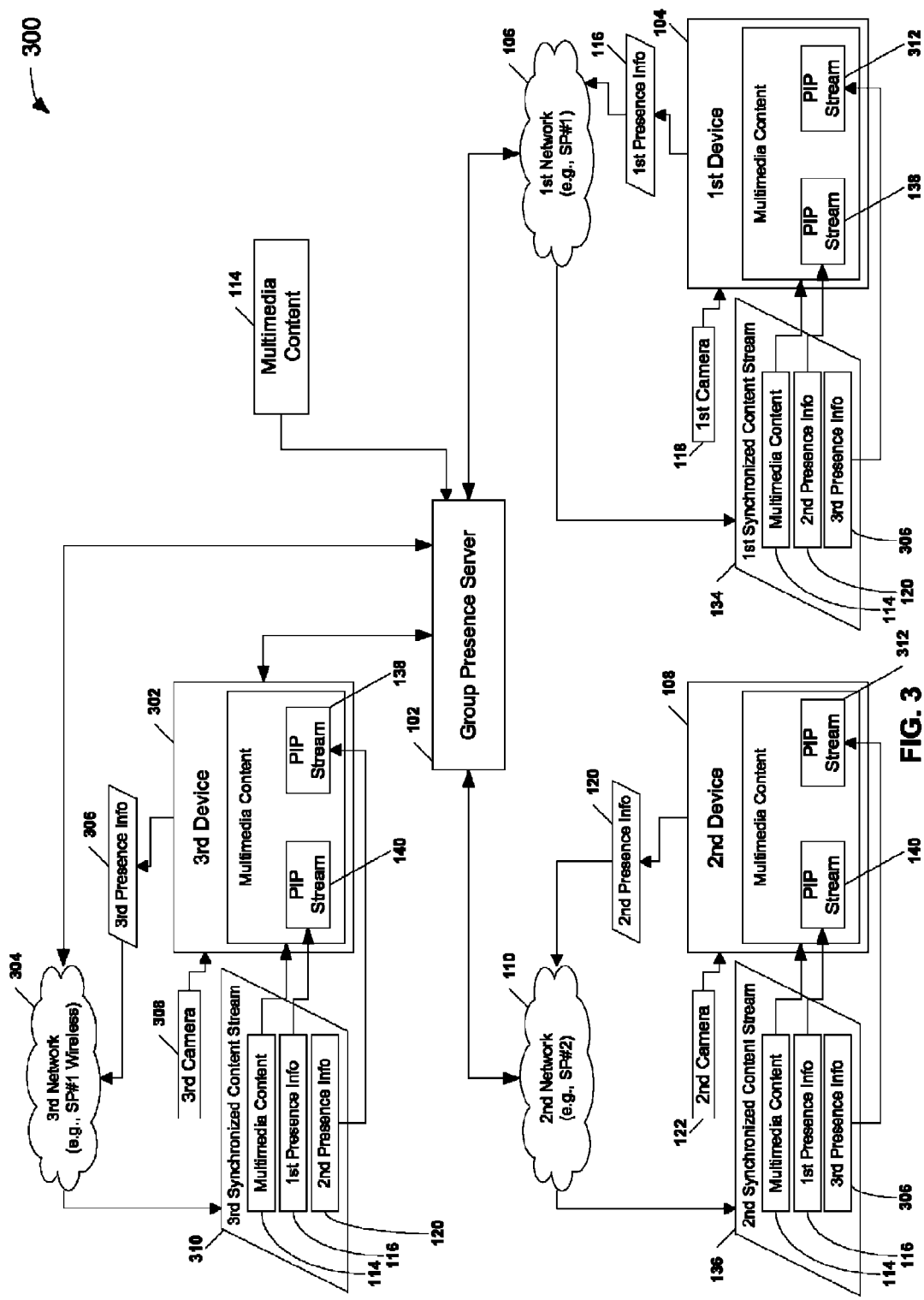
FIG. 3 is a block diagram of a third illustrative embodiment of a group presence system.

Referring to FIG. 3, a particular illustrative embodiment of a group presence system is shown and is designated 300. In the embodiment illustrated in FIG. 3, the system 300 includes the group presence server 102, the first device 104 associated with the first network 106, the second device 108 associated with the second network 110, and a third device 302 associated with a third network 304. In the embodiment illustrated in FIG. 3, the third network 304 includes a wireless network of the first communications service provider (e.g., the communications service provider associated with the first network 106). Thus, FIG. 3 illustrates that more than two users may experience a "shared" multimedia experience via a group presence session and that synchronized multimedia content and synchronized presence information may be provided to the devices over networks of different communications service providers or different networks of the same communications service provider (e.g., a wireline network and a wireless network).

In the embodiment illustrated in FIG. 3, the first network 106 is associated with a first communications service provider, and the second network 110 is associated with a second communications service provider (i.e., a different communications service provider). Further, the third network 304 is associated with a second network of the first communications service provider (e.g., a wireless network of the first communications service provider).

During the group presence session, the multimedia content 114 and presence information may be provided to each of the devices 104, 108, 302 at substantially the same time. For example, at substantially the same time, the second presence information 120 and third presence information 306 (e.g., video of a third user captured via a third camera 308 and audio from the third user) may be provided to the first device 104, the first presence information 116 and the third presence information 306 may be provided to the second device 108, and the first presence information 116 and the second presence information 120 may be provided to the third device 302. The device capabilities of the devices 104, 108, 302 and the network information associated with each of the networks 106, 110, 304 may be determined, and synchronization may be performed accordingly. In a particular embodiment, the multimedia content 114 and the presence information 120 may be sent to each of the devices 104, 108, 302 at substantially the same time. In another particular embodiment, the multimedia content 114 and the presence information 120 may be sent to the first device 104 at a first time, to the second device 108 at a second time, and to the third device 302 at a third time. In this case, send times may be determined based on an estimated time of receipt at a particular device (e.g., based on an estimated network delay), based on an estimated time of display at the particular device (e.g., based on a content rendering capability of the particular device), or a combination thereof.

The group presence server 102 is configured to transmit the first synchronized content stream 134 to the first device 106 via the first network 106. The first synchronized content stream 134 may include the multimedia content 114, the second presence information 120, and the third presence information 306. The group presence server 102 is further configured to transmit the second synchronized content stream 136 to the second device 108 via the second network 110. The second synchronized content stream 136 may include the multimedia content 114, the first presence information 116, and the third presence information 306. The group presence server 102 is further configured to transmit a third synchronized content stream 310 to the third device 302 via the third network 304. The third synchronized content stream 310 may include the multimedia content 114, the first presence information 116, and the second presence information 120.

In the embodiment illustrated in FIG. 3, the PIP stream 138 associated with the second presence information 120 may be superimposed on the multimedia content 114 when displayed via the first device 104 or via the third device 302. As another example, the PIP stream 140 associated with the first presence information 116 may be superimposed on the multimedia content 114 when displayed via the second device 108 or via the third device 302. As a further example, a PIP stream 312 associated with the third presence information 306 may be superimposed on the multimedia content 114 when displayed via the first device 104 or via the second device 108.

As an illustrative example, the multimedia content 114 may include a football match. By synchronizing the multimedia content 114 to be displayed at each of the devices 104, 108, 302 at substantially the same time, each of the users may experience a particular event during the football match (e.g., a goal) at substantially the same time. By synchronizing the presence information 116, 120, 306 to be displayed at the devices 104, 108, 302 at substantially the same time as the multimedia content 114, the users can experience each other's reactions to the goal as though each were watching the football match at the same location. The users may be able to adjust an amount of display area that is to be occupied by the PIP streams 116, 120, 312 in order to ensure that the viewing experience is not disrupted.

Thus, the system 300 of FIG. 3 may enable the users of multiple devices 104, 108, 302 to experience a "shared" multimedia experience with other users despite differences with respect to location, device capabilities, or networks (e.g., networks of different service providers or different networks of the same service provider).

Figure 4:
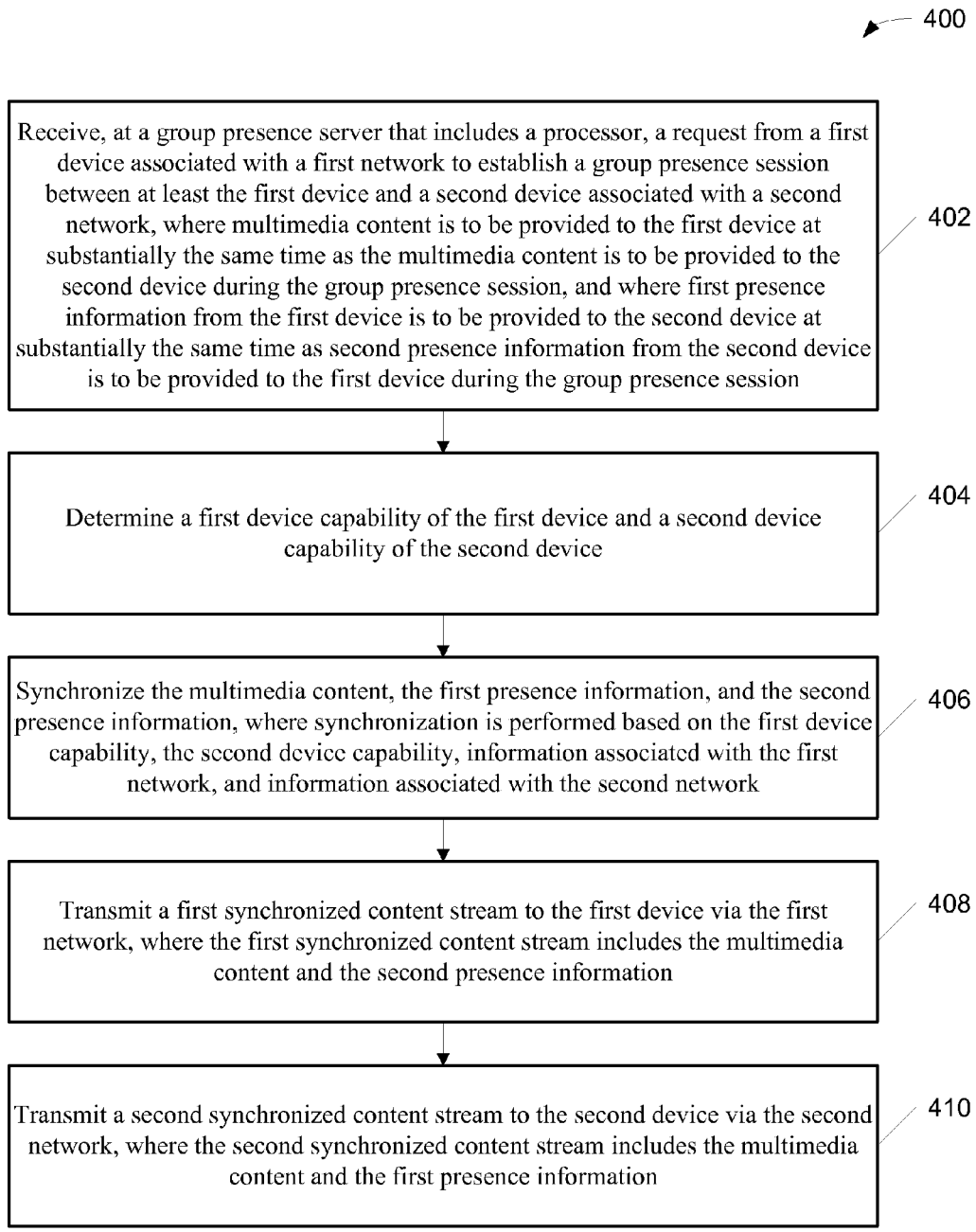
FIG. 4 is a flow chart of a first particular embodiment of a group presence method.

Referring to FIG. 4, an illustrative embodiment of a group presence method is shown and is designated 400. FIG. 4 illustrates that a group presence session may enable multiple users to experience a group presence session with synchronized multimedia content (e.g., television content) and synchronized presence information (e.g., video and/or audio associated with the each of the users). By synchronizing the multimedia content and the presence information, multiple users may experience a "shared" multimedia experience while located at different physical locations.

The method 400 may include receiving a request from a first device associated with a first network to establish a group presence session between at least the first device and a second device associated with a second network, at 402. The request is received at a group presence server that includes a processor. For example, the request may be the request 112 of FIGS. 1 and 2, and the request 112 may be received at the group presence server 102 from the first device 104 associated with the first network 106. The request 112 may be to establish a group presence session between at least the first device 104 and the second device 108 of the second network 110. In alternative embodiments, more than two devices associated with different networks may be included in the group presence session. For example, as illustrated in FIG. 3, the group presence session may include the first device 104 (e.g., associated with the first network 106 of a first communications service provider), the second device 108 (e.g., associated with the second network 110 of a second communications service provider), and the third device 302 (e.g., associated with the third network 304 that may be a wireless network of the first communications service provider).

Multimedia content is to be provided to the first device at substantially the same time as the multimedia content is to be provided to the second device during the group presence session. Further, first presence information from the first device is to be provided to the second device at substantially the same time as second presence information from the second device is to be provided to the first device during the group presence session. For example, in FIG. 1, the multimedia content 114 may be provided to the first device 104 at substantially the same time as the multimedia content 114 is provided to the second device 108. Further, the first presence information 116 may be provided to the second device 108 at substantially the same time as the second presence information 120 from the second device 108 is provided to the first device 104.

The method may include determining a first device capability of the first device and a second device capability of the second device, at 404. For example, in FIG. 1, the first device capability 124 of the first device 104, and the second device capability 126 of the second device 108 may be determined. In a particular illustrative embodiment, the device capabilities 124, 126 may be determined at the group presence server 102. In an alternative embodiment, the device capabilities 124, 126 may be determined via one or more applications of the application database 144 that is communicatively coupled to the group presence server 102.

The method may include synchronizing the multimedia content, the first presence information, and the second presence information, at 406. Synchronization may be performed based on the first device capability, the second device capability, information associated with the first network, and information associated with the second network. For example, the synchronization server of FIG. 1 may perform the synchronization based on the first device capability 124, the second device capability 126, the first network information 128, and the second network information 130.

The method may include transmitting a first synchronized content stream to the first device via the first network, where the first synchronized content stream includes the multimedia content and the second presence information, at 408. For example, in FIG. 1, the first synchronized content stream 134 may be transmitted from the group presence server 102 to the first device 104. In a particular illustrative embodiment, the second presence information 120 included in the first synchronized content stream 134 may be a PIP stream 138 that may be superimposed on the multimedia content 114 (e.g., television content). In alternative embodiments, the first synchronized content stream 134 may include presence information from other devices. In this case, multiple PIP streams may be superimposed on the multimedia content 114. As an example, in the embodiment illustrated in FIG. 3, the third presence information 306 from the third device 302 may be displayed as a separate PIP stream 312.

The method may include transmitting a second synchronized content stream to the second device via the second network, where the second synchronized content stream includes the multimedia content and the first presence information, at 410. For example, in FIG. 1, the second synchronized content stream 136 may be transmitted from the group presence server 102 to the second device 108. In a particular illustrative embodiment, the first presence information 116 included in the second synchronized content stream 136 may be a PIP stream 140 that may be superimposed on the multimedia content 114 (e.g., television content). In alternative embodiments, the second synchronized content stream 136 may include presence information from other devices. In this case, multiple PIP streams may be superimposed on the multimedia content 114. As an example, in the embodiment illustrated in FIG. 3, the third presence information 306 from the third device 302 may be displayed as a separate PIP stream 312.

Figure 5:
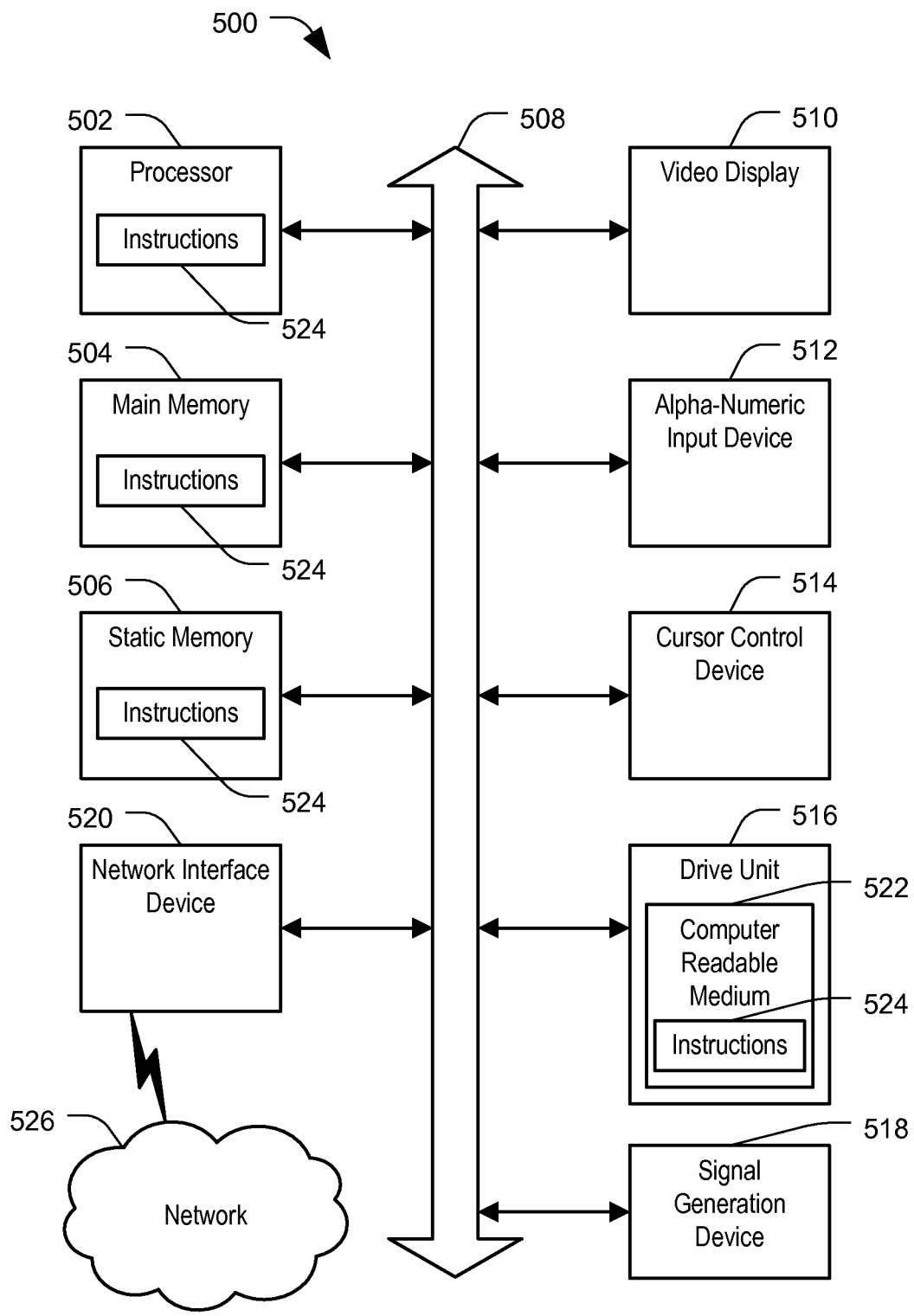
FIG. 5 is an illustration of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the general computer system 500 may include or be included within any one or more of the devices, servers, databases, and networks illustrated in FIGS. 1-3.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, or a solid state display. Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein.

In a particular embodiment, the instructions 524 include instructions that, when executed by the processor 502, cause the processor 502 to receive a request from a first device associated with a first network to establish a group presence session between at least the first device and a second device. During the group presence session, multimedia content is to be provided to the first device at substantially the same time as the multimedia content is to be provided to the second device, and first presence information from the first device is to be provided to the second device at substantially the same time as second presence information from the second device is to be provided to the first device. The instructions 524, when executed by the processor 502, cause the processor 502 to determine a first device capability of the first device and a second device capability of the second device. The instructions 524, when executed by the processor 502, cause the processor 502 to synchronize the multimedia content, the first presence information, and the second presence information based on the first device capability, the second device capability, information associated with the first network, and information associated with the second network. A first synchronized content stream that includes the multimedia content and the second presence information is transmitted to the first device via the first network. A second synchronized content stream that includes the multimedia content and the first presence information is transmitted to the second device via the second network.

In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, RTP, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method, comprising:
  receiving, at a group presence server that includes a processor, permission to establish a group presence session between a first device associated with a first network and a second device associated with a second network, wherein the group presence session provides a media content item to the first device and to the second device, provides first presence information to the second device, and provides second presence information to the first device, wherein the first presence information includes first video from a first camera associated with the first device, and wherein the second presence information includes second video from a second camera associated with the second device;
  determining, at the group presence server, a first device media rendering capability of the first device and a second device media rendering capability of the second device, wherein the first device media rendering capability indicates that the first device does not support picture-in-picture;

forming, at the group presence server based on the first device media rendering capability, the second device media rendering capability, information associated with the first network, and information associated with the second network, a first content stream and a second content stream, wherein the first content stream includes a modified version of the media content item with the second presence information merged with media content of the media content item to accommodate the first device not supporting picture-in-picture, wherein the second content stream is a composite stream of the media content item and the first presence information when the second device media rendering capability indicates the second device supports picture-in-picture, and wherein the first content stream and the second content stream are synchronized to provide a particular portion of the media content item to the first device and the second device at substantially the same time during the group presence session; and transmitting, from the group presence server, the first content stream to the first device via the first network and the second content stream to the second device via the second network;

wherein the group presence server is configured to adjust the first content stream and the second content stream to maintain synchronization of the first content stream and the second content stream during the group presence session.

2. The method of claim 1, further comprising:
determining that the second device needs software to participate in the group presence session, and
sending the software to the second device.

3. The method of claim 1, wherein the media content item is content of a subscription channel, and wherein the second device is assessed a charge to access the media content item during the group presence session when the second device is not associated with a subscription to the subscription channel.

4. The method of claim 1, wherein the second content stream is a composite stream of the media content item and the first presence information when the second device media rendering capability indicates that the second device supports picture-in-picture.

5. The method of claim 1, wherein the second content stream includes a second modified version of the media content item with the first presence information merged in the media content of the media content item to accommodate the second device not supporting picture-in-picture when the second device media rendering capability indicates that the second device does not support picture-in-picture.

6. The method of claim 1, wherein the first presence information and the second presence information enables participants in the group presence session to speak to each other.

7. The method of claim 1, wherein the media content item includes video on demand content.

8. The method of claim 1, wherein the first network includes an internet protocol television network of a first communications service provider.

9. The method of claim 8, wherein the second network includes a wireless network of the first communications service provider.

10. The method of claim 9, wherein the first device includes a set-top box device, and wherein the second device includes a wireless communication device.

11. The method of claim 8, wherein the second network is associated with a second communications service provider.

12. The method of claim 1, wherein the group presence server is associated with a multimedia content service provider, and wherein the media content is provided by the multimedia content service provider.

13. A computer readable storage device comprising instructions that, when executed by a processor, cause the processor to perform operations including:

receiving permission to establish a group presence session between a first device associated with a first network and a second device associated with a second network, wherein the group presence session provides a media content item to the first device and the second device, provides first presence information including first video from a first camera associated with the first device to the second device, and provides second presence information including second video from a second camera associated with the second device to the first device;

determining a first device media rendering capability of the first device and a second device media rendering capability of the second device, wherein the first device media rendering capability indicates that the first device does not support picture-in-picture;

forming, based on the first device media rendering capability, the second device media rendering capability, information associated with the first network, and information associated with the second network, a first content stream and a second content stream, wherein the first content stream includes a modified version of the media content item with the second presence information merged with media content of the media content item to accommodate the first device not supporting picture-in-picture, wherein the second content stream is a composite stream of the media content item and the first presence information when the second device media rendering capability indicates the second device supports picture-in-picture, and wherein the first content stream and the second content stream are synchronized to provide a particular portion of the media content item to the first device and the second device at substantially the same time during the group presence session;

transmitting the first content stream to the first device via the first network and the second content stream to the second device via the second network; and maintaining synchronization of the first content stream and the second content stream during the group presence session.

14. The computer readable storage device of claim 13, wherein the operations further include utilizing a retransmission buffer to inhibit disruption of the group presence session.

15. The computer readable storage device of claim 14, wherein the operations further include communicating a request user interface to the first device to enable a user of the first device to initiate the group presence session, and wherein the request user interface includes a plurality of selectable notification options.

16. The computer readable storage device of claim 15, wherein the plurality of selectable notification options includes an email notification option, an instant messaging message notification option, a text message notification option, a voice message notification option, and a social networking site message notification option.

17. A system comprising:
a processor;
a computer readable storage device comprising instructions that, when executed by the processor, cause the processor to perform operations including:
   receiving permission to establish a group presence session between a media device associated with a first network that provides television services and a second device associated with a second network, wherein the group presence session provides a media content item to the media device and the second device, provides first presence information to the second device, and provides second presence information to the media device, wherein the first presence information includes first video from a first camera associated with the media device, and wherein the second presence information includes second video from a second camera associated with the second device;
   determining a first media rendering capability of the media device and a second media rendering capability of the second device, wherein the second media rendering capability indicates that the second device does not support picture-in-picture;
   forming, based on the first media rendering capability, the second media rendering capability, information associated with the first network, and information associated with the second network, a first content stream and a second content stream, wherein the first content stream is a composite stream of the media content item and the second presence information when the first media rendering capability indicates the media device supports picture-in-picture, wherein the second content stream includes a modified version of the media content item with the first presence information merged with media content of the media content item to accommodate the second device not supporting picture-in-picture, and wherein the first content stream and the second content stream are synchronized to provide a particular portion of the media content to the media device and the second device at substantially the same time during the group presence session;
   transmitting the first content stream to the media device via the first network and the second content stream to the second device via the second network; and
   maintaining synchronization of the first content stream and the second content stream during the group presence session.

18. The system of claim 17, wherein the second network includes a wireless network, and wherein the first network and the wireless network are associated with a common communications service provider.

19. The system of claim 17, wherein the first network and the second network are associated with different communications service providers.

20. The system of claim 17, wherein the first content stream includes a second modified version of the media content item with the second presence information merged with the media content of the media content item when the first media rendering capability indicates the media device does not support picture-in-picture.

* * * * *